United States Patent
Yoshioka

(10) Patent No.: US 9,222,441 B2
(45) Date of Patent: Dec. 29, 2015

(54) EXHAUST GAS RECIRCULATION APPARATUS FOR ENGINE

(71) Applicant: Mamoru Yoshioka, Nagoya (JP)

(72) Inventor: Mamoru Yoshioka, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 302 days.

(21) Appl. No.: 13/894,925

(22) Filed: May 15, 2013

(65) Prior Publication Data

US 2013/0319383 A1    Dec. 5, 2013

(30) Foreign Application Priority Data

May 31, 2012    (JP) ................ 2012-125044

(51) Int. Cl.
*F02M 25/07* (2006.01)
*F02D 41/00* (2006.01)
*F02D 41/12* (2006.01)

(52) U.S. Cl.
CPC ......... *F02M 25/0701* (2013.01); *F02D 41/005* (2013.01); *F02D 41/0077* (2013.01); *F02D 41/123* (2013.01); *F02M 25/074* (2013.01); *F02M 25/0707* (2013.01); *F02M 25/0709* (2013.01); *F02M 25/0726* (2013.01); *F02M 25/0772* (2013.01); *F02D 2200/0406* (2013.01); *Y02T 10/47* (2013.01)

(58) Field of Classification Search
CPC .............. F02M 25/072; F02M 25/074; F02M 25/0717; F02M 25/0746; F02M 25/0788
USPC .............................. 123/568.21, 568.12, 568.2
See application file for complete search history.

(56) References Cited

U.S. PATENT DOCUMENTS

| | | | |
|---|---|---|---|
| 6,032,461 A * | 3/2000 | Kinugasa et al. | ............... 60/295 |
| 6,089,019 A * | 7/2000 | Roby et al. | ................... 60/605.2 |
| 7,370,644 B2 | 5/2008 | Wang | |
| 2004/0150260 A1 | 8/2004 | Inagaki et al. | |
| 2006/0272625 A1* | 12/2006 | Wang | ....................... 123/568.16 |

FOREIGN PATENT DOCUMENTS

| | | |
|---|---|---|
| CN | 1873205 A | 12/2006 |
| JP | 563-41652 A | 2/1988 |

(Continued)

OTHER PUBLICATIONS

Jun. 16, 2015 Office Action issued in Japanese Patent Application No. 2012-125044.

(Continued)

*Primary Examiner* — Lindsay Low
*Assistant Examiner* — Kevin Lathers
(74) *Attorney, Agent, or Firm* — Oliff PLC

(57) ABSTRACT

An EGR apparatus includes a EGR passage for allowing part of exhaust gas discharged from a combustion chamber of an engine to an exhaust passage to flow in an intake passage and recirculate back to the combustion chamber, and an EGR valve provided in the EGR passage to regulate an EGR passage in this passage. The EGR valve includes a valve seat, a valve element to be seatable on the valve seat, and a step motor for driving the valve element to open and close. An electronic control device controls the EGR valve to repeat opening and closing of the valve element between a closing position and a small opening position in order to remove foreign matters adhered to the valve seat or valve element during deceleration fuel cutoff of the engine.

10 Claims, 12 Drawing Sheets

(56) References Cited

FOREIGN PATENT DOCUMENTS

| JP | H08-246918 | A | 9/1996 |
| JP | A-2003-56411 | | 2/2003 |
| JP | 2004-196236 | A | 7/2004 |
| JP | 2004-293312 | A | 10/2004 |
| JP | A-2007-182840 | | 7/2007 |
| JP | A-2007-218176 | | 8/2007 |
| JP | 2007-309115 | A | 11/2007 |
| JP | A-2011-252482 | | 12/2011 |
| JP | 2012-007561 | A | 1/2012 |

OTHER PUBLICATIONS

Feb. 27, 2015 Office Action issued in Chinese Patent Application No. 201310189089.6.

* cited by examiner

Number of Stages of Small Valve Opening

EXHAUST GAS RECIRCULATION APPARATUS FOR ENGINE

CROSS-REFERENCE TO RELATED APPLICATIONS

This application is based upon and claims the benefit of priority from the prior Japanese Patent Application No. 2012-125044, filed May 31, 2012, the entire contents of which are incorporated herein by reference.

BACKGROUND OF THE INVENTION

1. Field of the Invention

The present invention relates to an exhaust gas recirculation (EGR) apparatus for engine to allow part of exhaust gas discharged from an engine to an exhaust passage to flow in an intake passage to recirculate back to the engine.

2. Related Art

Conventionally, a technique of the above type is employed in a vehicle engine. An exhaust gas recirculation (EGR) apparatus is arranged to introduce part of exhaust gas after combustion, which is discharged from a combustion chamber of an engine to an exhaust passage, into an intake passage through an EGR passage so that the exhaust gas is mixed with intake air flowing in the intake passage and flows back to the combustion chamber. EGR gas flowing in an EGR passage is regulated by an EGR valve provided in the EGR passage. This EGR can reduce mainly nitrogen oxide (NOx) in the exhaust gas and improve fuel consumption during a partial load of the engine.

Exhaust gas from the engine contains no oxygen or is in an oxygen lean state. Thus, when part of the exhaust gas is mixed with the intake air by EGR, the oxygen concentration of the intake air decreases. In a combustion chamber, therefore, fuel burns in a low oxygen concentration. Thus, a peak temperature during combustion decreases, thereby restraining the occurrence of NOx. In a gasoline engine, even when the content of oxygen in intake air is not increased by EGR and a throttle valve is closed to some degree, it is possible to reduce pumping loss of the engine.

Herein, recently, it is conceivable to perform EGR in the entire operating range of the engine in order to further improve fuel consumption. Realization of high EGR is thus demanded. To realize the high EGR, it is necessary for conventional arts to increase the internal diameter of an EGR passage or increase the opening area of a flow passage provided by a valve element and a valve seat of an EGR valve.

Meanwhile, as the EGR valve, an electrically-operated EGR valve is used, in which a valve element is opened and closed by a step motor to control small or fine opening position. In this type of EGR valve, a problem may occur in which foreign particles such as carbon particles in exhaust gas or hard foreign matters such as cutting chips are lodged or caught between the valve seat and the valve element. In case the foreign matters are lodged between the valve seat and the valve element, the valve element is not allowed to completely seat on the valve seat. This may cause step-out of the step motor and hence failures of EGR control. An amount of foreign matters lodged between the valve element and the valve seat may be increased as the opening area of a flow passage defined by the valve element and the valve seat is increased for high EGR.

In association with such lodging of foreign matters, an EGR apparatus disclosed in Patent Document 1 listed below is arranged to open, before start of engine cranking (before the start of engine starting), the valve element of the EGR valve at least once to a fully opened position to perform a removing operation to make foreign matters fall down from the valve seat. To be concrete, the valve element is moved from a fully closed position to a fully opened position and thereafter returned to the fully closed position. It is conceivable that this operation of "Fully-closed→Fully-opened→Fully-closed" is repeated several times.

RELATED ART DOCUMENTS

Patent Documents

Patent Document 1: JP-A-2003-56411

SUMMARY OF INVENTION

Problems to be Solved by the Invention

However, in the EGR apparatus disclosed in Patent Document 1, the foreign matters lodged between the valve seat and the valve element are merely removed before the start of engine starting. Thus, the foreign matters may be caught or lodged again between the valve seat and the valve element after engine starting. In this EGR apparatus, furthermore, the foreign matters lodged in the EGR valve after engine starting remain unremoved until next engine starting. Accordingly, lodging of the foreign matters after engine starting may generate gaps between the valve seat and the valve element, causing leakage of EGR gas. In this device, moreover, the valve element is simply opened from the fully closed position to the fully opened position in order to attempt to drop the foreign matters so that the foreign matters be removed from the EGR valve. Thus, the foreign matters sticking to the valve seat and the valve element are hard to come off and may not be removed.

The present invention has been made in view of the circumstances and has a purpose to provide an exhaust gas recirculation apparatus for engine to reliably remove foreign matters which are stuck to a valve seat or a valve element in an EGR valve or lodged between the valve seat and the valve element.

Means of Solving the Problems

To achieve the above purpose, one aspect of the invention provides an exhaust gas recirculation apparatus for engine, comprising: an exhaust gas recirculation passage for allowing part of exhaust gas discharged from a combustion chamber of an engine to an exhaust passage to flow in an intake passage and recirculate back to the combustion chamber; and an exhaust gas recirculation valve provided in the exhaust gas recirculation passage to regulate an exhaust flow rate in the exhaust gas recirculation passage, the exhaust gas recirculation valve including a valve seat, a valve element provided to be seatable on the valve seat, and an actuator to drive the valve element, wherein the apparatus further includes a foreign-matter removal control unit to control the exhaust gas recirculation valve to repeatedly open and close the valve element between a closing position and a small opening position to remove foreign matters stuck to the valve seat or the valve element.

Effects of the Invention

According to the invention, it is possible to reliably remove foreign matters which are stuck to a valve seat or a valve element in an EGR valve or lodged between the valve seat and the valve element.

DESCRIPTION OF EMBODIMENTS

First Embodiment

A detailed description of a preferred first embodiment of an exhaust gas recirculation apparatus for engine embodying the present invention will now be given referring to the accompanying drawings.

Figure 1:
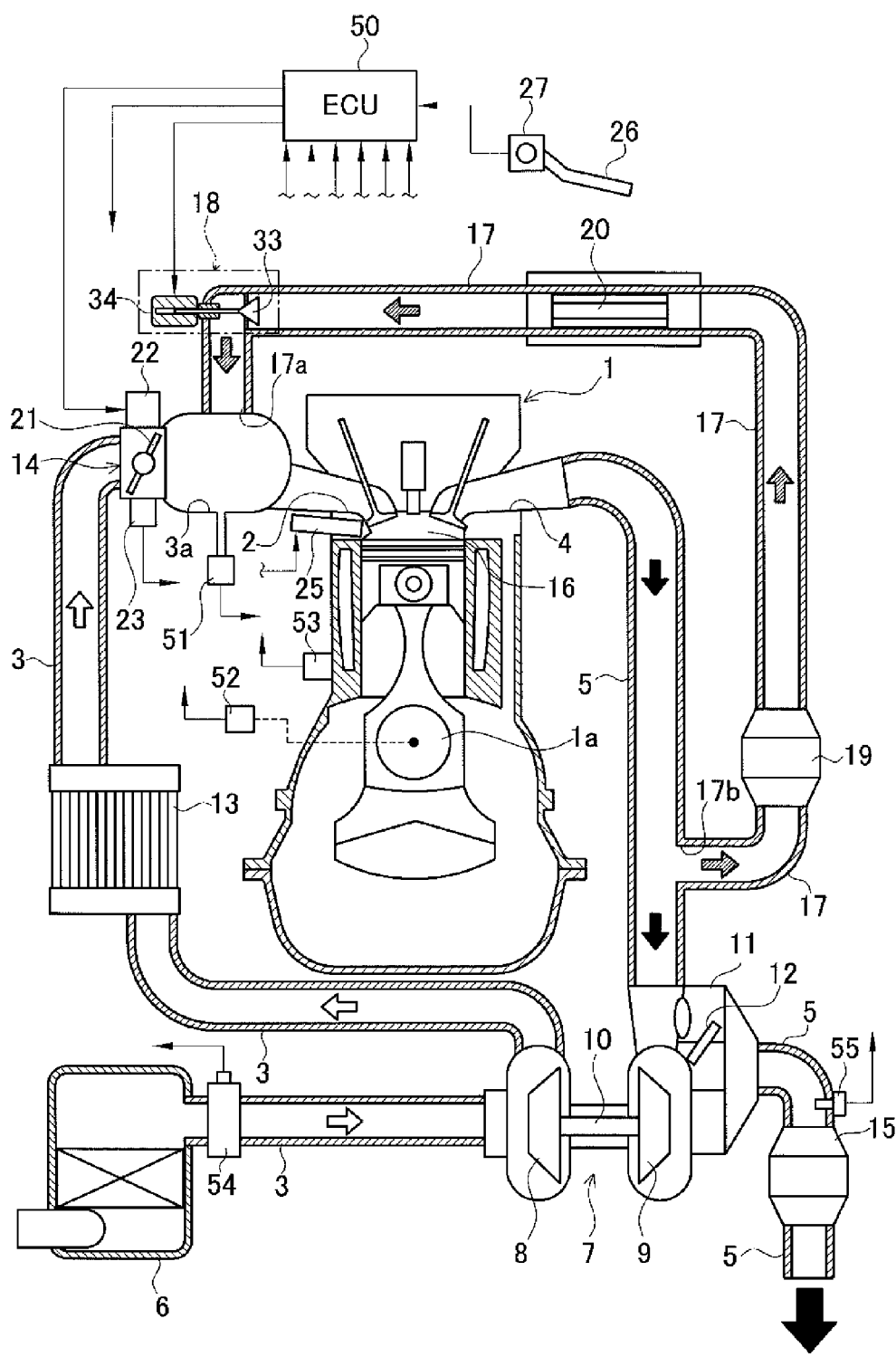
FIG. 1 is a schematic configuration view showing a supercharger-equipped engine system including an exhaust gas recirculation (EGR) apparatus for engine in a first embodiment.

FIG. 1 is a schematic configuration view of a supercharger-equipped engine system including an exhaust gas recirculation (EGR) apparatus for engine in this embodiment. This engine system includes a reciprocating-type engine 1. This engine 1 has an intake port 2 connected to an intake passage 3 and an exhaust port 4 connected to an exhaust passage 5. An air cleaner 6 is provided at an inlet of the intake passage 3. In the intake passage 3 downstream from the air cleaner 6, a supercharger 7 is placed in a position between a portion of the intake passage 3 and a portion of the exhaust passage 5 to raise the pressure of intake air in the intake passage 3.

The supercharger 7 includes a compressor 8 placed in the intake passage 3, a turbine 9 placed in the exhaust passage 5, and a rotary shaft 10 connecting the compressor 8 and the turbine 9 so that they are integrally rotatable. The supercharger 7 is configured to rotate the turbine 9 with exhaust gas flowing in the exhaust passage 5 and integrally rotate the compressor 8 through the rotary shaft 10 in order to increase the pressure of intake air in the intake passage 3, that is, carry out supercharging.

In the exhaust passage 5, adjacent to the supercharger 7, an exhaust bypass passage 11 is provided by detouring around the turbine 9. In this exhaust bypass passage 11, a waste gate valve 12 is placed. This waste gate valve 12 regulates exhaust gas allowed to flow in the exhaust bypass passage 11. Thus, a flow rate of exhaust gas to be supplied to the turbine 9 is regulated, thereby controlling the rotary speeds of the turbine 9 and the compressor 8, and adjusting supercharging pressure of the supercharger 7.

In the intake passage 3, an intercooler 13 is provided between the compressor 8 of the supercharger 7 and the engine 1. This intercooler 13 serves to cool intake air having the pressure raised by the compressor 8 and hence a high temperature, down to an appropriate temperature. A surge tank 3a is provided in the intake passage 3 between the intercooler 13 and the engine 1. Further, an electronic throttle device 14 that is an electrically-operated throttle valve is placed downstream from the intercooler 13 but upstream from the surge tank 3a. This throttle device 14 includes a butterfly-shaped throttle valve 21 placed in the intake passage 3, a step motor 22 to drive the throttle valve 21 to open and close, and a throttle sensor 23 to detect an opening position (a throttle opening position) TA of the throttle valve 21. This throttle device 14 is configured so that the throttle valve 21 is driven by the step motor 22 to open and close according to operation of an accelerator pedal 26 by a driver to adjust the opening position. The configuration of this throttle device 14 can be provided by for example a basic configuration of a "throttle device" disclosed in JP-A-2011-252482, FIGS. 1 and 2. In the exhaust passage 5 downstream from the turbine 9, a catalytic converter 15 is provided as an exhaust catalyst to clean exhaust gas.

The engine 1 is further provided with an injector 25 to inject and supply fuel into a combustion chamber 16. The injector 25 is configured to be supplied with the fuel from a fuel tank (not shown). This injector 25 is one example of a fuel supply unit of the invention to supply fuel to the engine 1.

In the present embodiment, the EGR apparatus to enable high EGR includes an exhaust gas recirculation (EGR) passage 17 allowing part of exhaust gas discharged from the combustion chamber 16 of the engine 1 to the exhaust passage 5 to flow in the intake passage 3 and recirculate back to the combustion chamber 16, and an exhaust gas recirculation (EGR) valve 18 placed in the EGR passage 17 to regulate an exhaust gas flow rate (EGR flow rate) in the EGR passage 17. The EGR passage 17 is provided to extend between the exhaust passage 5 upstream from the turbine 9 and the surge tank 3a. Specifically, an outlet 17a of the EGR passage 17 is connected to the surge tank 3a on a downstream side from the throttle valve 21 in order to allow a part of exhaust gas flowing in the exhaust passage 5 to flow as EGR gas into the intake passage 3 and recirculate to the combustion chamber 16. An inlet 17b of the EGR passage 17 is connected to the exhaust passage 5 upstream from the turbine 9.

In the vicinity of the inlet 17b of the EGR passage 17, an EGR catalytic converter 19 is provided to clean EGR gas. In the EGR passage 17 downstream from this EGR catalytic converter 19, an EGR cooler 20 is provided to cool EGR gas flowing in the EGR passage 17. In the present embodiment, the EGR valve 18 is located in the EGR passage 17 downstream from the EGR cooler 20.

Figure 2:
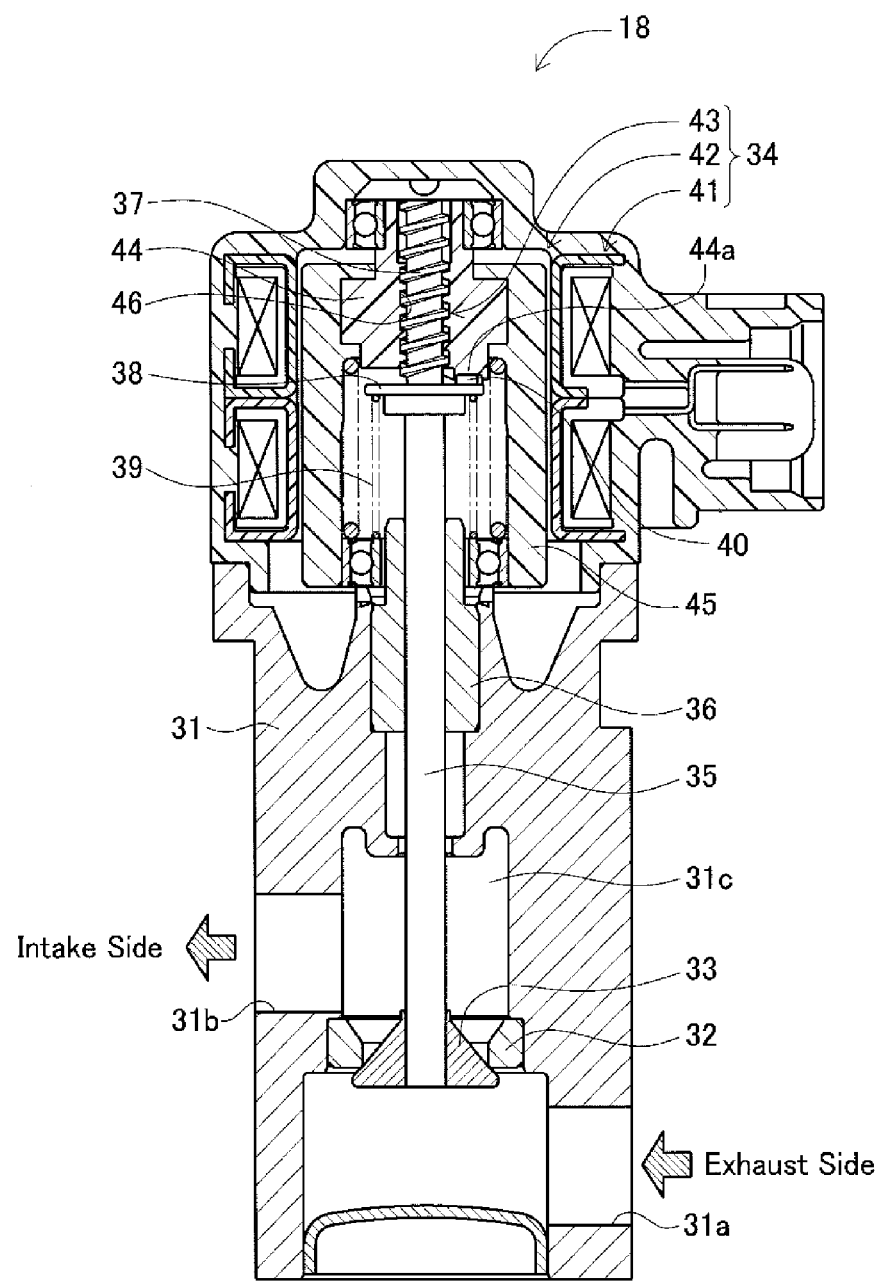
FIG. 2 is a cross sectional view schematically showing an EGR valve in the first embodiment.

FIG. 2 is a cross sectional view showing a schematic configuration of the EGR valve 18. As shown in FIG. 2, the EGR valve 18 is configured as a poppet valve and a motor-operated valve. Specifically, the EGR valve 18 is provided with a housing 31, a valve seat 32 provided in the housing 31, a valve element 33 configured to seat on and move apart from the valve seat 32 inside the housing 31, and a step motor 34 to perform stroke movement of the valve element 33. The step motor 34 is one example of an actuator of the present invention. The housing 31 includes an inlet 31a through which EGR gas flows from the side of the exhaust passage 5 (an exhaust side) into the EGR valve 18, an outlet 31b through which exhaust gas flows out of the valve 18 to the side of the intake passage 3 (an intake side), and a communication passage 31c connecting the inlet 31a and the outlet 31b. The valve seat 32 is provided at the midpoint of the communication passage 31c. Herein, in the EGR passage 17, pulsation of the exhaust gas pressure of the engine 1, generated in the exhaust passage 5, acts on the inlet 17b, while pulsation of the intake pressure of the engine 1, generated in the surge tank 3a, acts on the outlet 17a. On the valve element 33 of the EGR valve 18, accordingly, the pulsation of the exhaust gas pressure on an upstream side of the EGR passage 17 acts via the inlet 31a, while the pulsation of intake pressure on a downstream side of the EGR passage 17 acts via the outlet 31b.

The step motor 34 includes an output shaft 35 arranged to reciprocate in a straight line (stroke movement). The valve element 33 is fixed at a leading end of the output shaft 35. This output shaft 35 is supported to be able to perform stroke movement through a bearing 36 provided in the housing 31. The output shaft 35 is formed, in its upper part, with a male screw section 37. The output shaft 35 is further formed, in its middle part (near a lower end of the male screw section 37), with a spring retainer 38. This spring retainer 38 has a lower surface serving as a rest for holding a compression spring 39 and an upper surface formed with a stopper 40.

The valve element 33 has a conical shape and is configured to come into or out of contact with the valve seat 32. The valve element 33 is urged toward the step motor 34 by the compression spring 39 placed between the spring retainer 38 and the housing 31, that is, in a valve closing direction to seat on the valve seat 32. When the valve element 33 in a closed state is stroke-moved by the output shaft 35 of the step motor 34 against the urging force of the compression spring 39, the valve element 33 is moved apart from the valve seat 32 to a valve open state. For valve opening, specifically, the valve element 33 is moved toward the upstream side (exhaust side) of the EGR passage 17. As above, the EGR valve 18 is configured to open by moving the valve element 33 from the closed state in which the valve element 33 seats on the valve seat 32 toward the upstream side of the EGR passage 17 against the exhaust gas pressure or intake pressure of the engine 1. On the other hand, the valve element 33 is stroke-moved from the open state in the urging direction of the compression spring 39 by the output shaft 35 of the step motor 34, so that the valve element 33 comes near the valve seat 32 and into the closed state. For valve closing, specifically, the valve element 33 is moved toward the downstream side (intake side) of the EGR passage 17.

By stroke-moving the output shaft 35 of the step motor 34, the opening position of the valve element 33 with respect to the valve seat 32 is adjusted. The output shaft 35 of the EGR valve 18 is arranged to be stroke-movable in a range from the fully closed state where the valve element 33 seats on the valve seat 32 to the fully opened state where the valve element 33 is most apart from the valve seat 32. To achieve high EGR, in the present embodiment, the area of a passage opening in the valve seat 32 is set larger than that in the conventional art. Accordingly, the valve element 33 is designed to be larger in size than that in the conventional art.

The step motor 34 includes a coil 41, a magnet rotor 42, and a converting mechanism 43. The step motor 34 is configured so that the coil 41 is excited by energization to rotate the magnet rotor 42 by a predetermined number of motor steps Mst(n), the converting mechanism 43 converts the rotational movement of the magnet rotor 42 into the stroke movement of the output shaft 35, thereby stroke-moving the valve element 33.

The magnet rotor 42 includes a rotor body 44 made of resin and a ring-shaped plastic magnet 45. The rotor body 44 is formed, in its center, with a female screw section 46 threadedly engaging with the male screw section 37 of the output shaft 35. When the rotor body 44 is rotated with its female screw section 46 threadedly engaging with the male screw section 37 of the output shaft 35, the rotational movement of the rotor body 44 is converted to stroke movement of the output shaft 35. Herein, the male screw section 37 and the female screw section 46 constitute the aforementioned converting mechanism 43. The rotor body 44 is formed, at its bottom, with a contact portion 44a against which the stopper 40 of the spring retainer 38 abuts. When the EGR valve 18 is placed at the full closing position, the end face of the stopper 40 comes into surface contact with the end face of the contact portion 44a, thereby restricting the initial position of the output shaft 35.

In the present embodiment, the number of motor steps Mst(n) of the step motor 34 is changed in a stepwise manner to finely adjust the opening position of the valve element 33 of the EGR valve 18 in stages in a range between full close and full open.

As shown in FIG. 1, in the present embodiment, for executing fuel injection control, intake amount control, EGR control, and other controls, the injector 25, the step motor 22 of the electronic throttle device 14, and the step motor 34 of the EGR valve 18 are each controlled by an electronic control unit (ECU) 50 according to the operating condition of the engine 1. The ECU 50 includes a central processing unit (CPU), various memories that store a predetermined control program and others or temporarily store calculation results and others of the CPU, and an external input circuit and an external output circuit connected to each of them. The ECU 50 corresponds to a foreign-matter removal control unit, a foreign-matter lodging determination unit, an exhaust gas recirculation control unit, and a processing determining unit. To the external output circuit, there are connected the injector 25 and each of the step motors 22 and 34. To the external input circuit, there are connected the throttle sensor 23 and various sensors 27 and 51-55 corresponding to an operating condition detection unit. These sensors are used to detect the operating condition of the engine 1 and transmit various engine signals to the external input circuit. The ECU 50 is also arranged to output a predetermined command signal to the step motor 34 in order to control the step motor 34.

The various sensors provided in the present embodiment include the accelerator sensor 27, the intake pressure sensor 51, the rotational speed sensor 52, the water temperature sensor 53, the air flow meter 54, and the air-fuel ratio sensor 55 as well as the throttle sensor 23. The accelerator sensor 27 detects an accelerator opening position ACC corresponding to an operation amount of the accelerator pedal 26. This accelerator pedal 26 is one example of an operating unit to control the operation of the engine 1. The intake pressure sensor 51 detects intake pressure PM in the surge tank 3a. That is, the intake pressure sensor 51 is one example of an intake pressure detection unit of the invention to detect the intake pressure PM in the intake passage 3 (the surge tank 3a) downstream from the position in which EGR gas flows from the EGR passage 17 to the intake passage 3. The rotational speed sensor 52 detects the rotation angle (the crank angle) of the crank shaft 1a of the engine 1 and also detects changes of the crank angle as the rotational speed (engine rotational speed) NE of the engine 1. The water temperature sensor 53 detects the cooling water temperature THW of the engine 1. Specifically, the water temperature sensor 53 is one example of a temperature-state detection unit of the invention to detect the cooling water temperature THW representing the temperature state of the engine 1. The air flow meter 54 is one example of an intake amount measurement unit of the invention to detect an intake amount Ga flowing in the intake passage 3 directly downstream of the air cleaner 6. The air-fuel ratio sensor 55 is placed in the exhaust passage 5 directly upstream of the catalytic convertor 15 to detect an air-fuel ratio A/F in the exhaust gas.

In the present embodiment, the ECU 50 is arranged to control the EGR valve 18 in order to control EGR according to the operating condition of the engine 1 in the entire operating range of the engine 1. On the other hand, during deceleration of the engine 1 and deceleration fuel cutoff in which fuel supply to the engine 1 is being cut off, the ECU 50 controls the EGR valve 18 to fully close to shut off the flow of EGR. During the deceleration fuel cutoff; furthermore, the ECU 50 controls the EGR valve 18 to execute various controls which will be mentioned later under a predetermined condition.

Herein, in the EGR valve 18, a problem may occur in which foreign matters such as deposits adhere to or lodge between the valve seat 32 and the valve element 33. In the present embodiment, therefore, various controls mentioned below are executed by the ECU 50 to remove the foreign matters from the valve seat 32 or the valve element 33 or prevent adhesion of the foreign matters to the valve seat 32 or the valve element 33.

Figure 3:
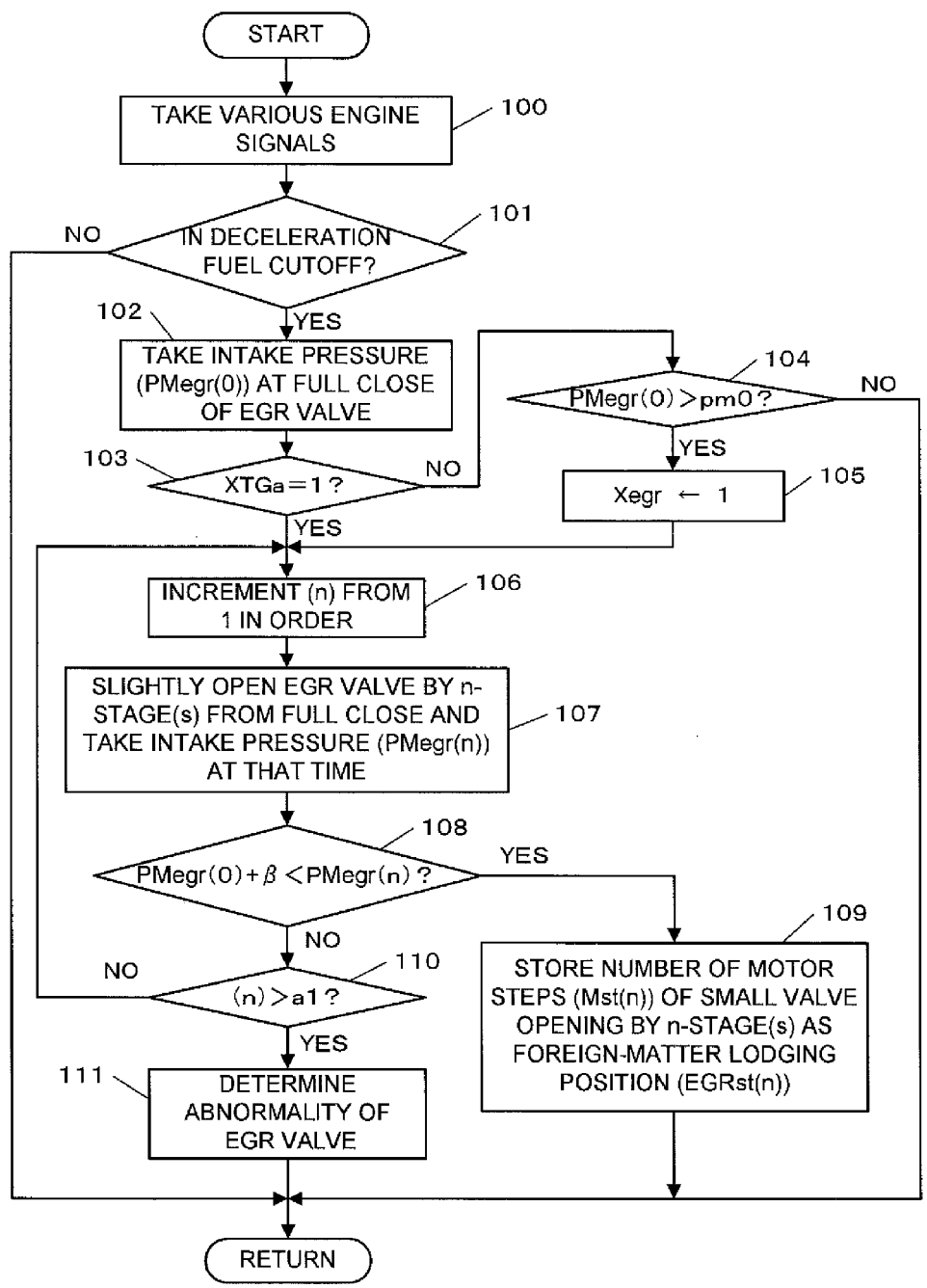
FIG. 3 is a flowchart showing one example of details of processing of foreign-matter lodging determination in the first embodiment.

FIG. 3 is a flowchart showing one example of details of the processing of the foreign-matter lodging determination to be executed by the ECU 50. The foreign-matter lodging determination is the processing to determine the presence/absence of foreign matters lodged between the valve seat 32 and the valve element 33 in the EGR valve 18 and, if the lodged foreign matters are present, to determine which position (opening position) of the valve element 33 foreign matters are lodged in.

When the processing shifts to this routine, the ECU 50 first takes, in Step 100, various engine signals representing the operating condition of the engine 1.

In Step 101, the ECU 50 determines whether or not the engine 1 is in the deceleration fuel cutoff condition. Specifically, the ECU 50 determines whether or not the engine 1 is decelerating and the fuel supply from the injector 25 to the engine 1 is being cut off. The ECU 50 returns the processing to Step 100 if a negative result (NO) is obtained in Step 101 or shifts the processing to Step 102 if an affirmative result (YES) is obtained in Step 101.

In Step 102, the ECU 50 takes intake pressure PMegr(0) detected by the intake pressure sensor 51 when the EGR valve 18 is at full close (a fully closed position). In the present embodiment, during deceleration fuel cutoff of the engine 1, the EGR valve 18 is controlled to fully close once. Accordingly, the ECU 50 takes the intake pressure PM at that time as the intake pressure PMegr(0) during full close. In the present embodiment, the number of motor steps Mst(0) during full close of the EGR valve 18 is for example "5".

In Step 103, thereafter, the ECU 50 determines whether or not an execution flag XTGa is "1". The execution flag XTGa is set to "1" in the case of permitting foreign-matter removing operation of the EGR valve 18 and set to "0" in the case of not permitting the foreign-matter removing operation. This is determined based on an accumulated or integrated value of the intake amount Ga as will be mentioned later. This execution flag XTGa is "1" when the accumulated value of the intake amount Ga from start of the EGR control becomes a predetermined reference value A1 or more as will be described later. If NO in Step 103, the ECU 105 shifts the processing to Step 104. If YES in Step 103, the ECU 105 shifts the processing to Step 106.

In Step 104, the ECU 50 determines whether or not the intake pressure PMegr(0) during full close of the EGR valve 18 is larger than a predetermined reference value pm0. This reference value pm0 corresponds to an absolute value of the intake pressure PM that should be obtained during full close of the EGR valve 18. If NO in Step 104, it is considered that the fully closed state of the EGR valve 18 is normal and no foreign matters are lodged, and thus the ECU 50 returns the processing to Step 100.

If YES in Step 104, it is considered that the fully closed state of the EGR valve 18 is not normal and some foreign matters are lodged, and thus the ECU 50 sets the foreign-matter lodging determination flag Xegr to "1" in Step 105 and shifts the processing to Step 106.

In Step 106 following Step 103 or 105, the ECU 50 increments a value (n) mentioned later one by one. At this stage, (n) is (1).

In Step 107, successively, the ECU 50 controls the step motor 34 to finely or slightly open the EGR valve 18 by a stage (n) from full close and takes the intake pressure PM detected by the intake pressure sensor 51 at that time as intake pressure PMegr(n). Since "n=−1" at this stage, the ECU 50 slightly opens the EGR valve 18 by one stage from the fully closed position and takes the intake pressure PM at that time as intake pressure PMegr(1). In the present embodiment, the number of motor steps Mst(1) when the EGR valve 18 is slightly opened by initial one stage is for example "8 (=5+3)".

In Step 108, the ECU 50 then determines whether or not a change from the intake pressure PMegr(0) during full close of the EGR valve 18 to the intake pressure PMegr(n) at the time when the EGR valve 18 is slightly opened by n-stage(s) is larger than a predetermined reference value 13, that is, whether or not the intake pressure PM has been changed more than a certain degree. Since "n=1" at this time, the ECU 50 determines whether or not a change from the intake pressure PMegr(0) during fill close to the intake pressure PMegr(1) at the time of slightly opening by one stage is larger than the reference value β. If YES in Step 108, that is, if the intake pressure PM has been somewhat changed, the valve element 33 is considered as having actually moved, and the ECU 50 shifts the processing to Step 109.

In Step 109, the ECU 50 stores, in a memory, the number of motor steps Mst(n) at the time of slightly opening by n-stage (s) as the foreign-matter lodging position EGRst(n), and returns the processing to Step 100. Herein, the opening position of the valve element 33 obtained when the valve element 33 is slightly opened and the intake pressure PM is changed is stored in the memory as the foreign-matter lodging position EGRst(n). At this stage, the number of motor steps Mst(1) at the time of slightly opening open by one stage, i.e., for example "8" is stored in the memory as the foreign-matter lodging position EGRst(1).

On the other hand, if No in Step 108, that is, if the intake pressure PM has not been somewhat changed, the valve element 33 is not considered as having been moved, and the ECU 50 determines in Step 110 whether or not the aforementioned value (n) is larger than a predetermined reference value a1.

Herein, the reference value a1 represents the maximum number of stages related to small open of the EGR valve 18 and is a natural number. In the present embodiment, the reference value a1 can be expressed by for example "7". If NO in Step 110, the ECU 50 returns the processing to Step 106.

In Step 106, the ECU 50 increases the value (n) in increments of 1. At this stage, (n) is (2).

In Step 107, the ECU 50 controls the step motor 34 in a similar manner to the above to slightly open the EGR valve 18 newly by n-stage(s) and takes intake pressure PMegr(n) detected by the intake pressure sensor 51 at that time. Since "n=2" at this time, the ECU 50 slightly opens the EGR valve 18 by two stages. In the present embodiment, the number of motor steps Mst(2) when the EGR valve 18 is slightly opened up to a second stage is for example "11 (5+6)".

Thereafter, in Step 108, the ECU 50 determines whether or not a change from the intake pressure PMegr(0) during full close of the EGR valve 18 to the intake pressure PMegr(n) at the time of slightly opening by n-stage(s) is larger than the reference value β. Since "n=2" at this time, the ECU 50 determines whether or not a change from the intake pressure PMegr(0) during full close to the intake pressure PMegr(2) at the time of slightly opening by two stages is larger than the reference value β. If YES in Step 108, that is, if the intake pressure PM has been somewhat changed, the valve element 33 is considered as having been actually moved, and the ECU 50 shifts the processing to Step 109.

In Step 109, the ECU 50 stores, in the memory, the number of motor steps Mst(n) at the time of slightly opening by n-stage(s) as the foreign-matter lodging position EGRst(n), and returns the processing to Step 100. Herein, the opening position of the valve element 33 obtained when the valve element 33 is slightly opened and the intake pressure PM is changed is stored in the memory as the foreign-matter lodging position EGRst(n). At this stage, the number of motor steps Mst(2) at the time of slightly opening by two stages, i.e., for example "11" is stored in the memory as the foreign-matter lodging position EGRst(2).

On the other hand, if NO in Step 108, that is, if the intake pressure PM has not been somewhat changed, the valve element 33 is not considered as having been moved, and the ECU 50 determines in Step 110 whether or not the aforementioned value (n) is larger than the reference value a1. If NO in Step 110, the ECU 50 returns the processing to Step 106 again.

In Step 106, the ECU 50 increases the value (n) in increments of 1. At this stage, (n) is (3).

In Step 107, subsequently, the ECU 50 controls the step motor 34 in a similar manner to the above to slightly open the EGR valve 18 newly by n-stage(s) and takes the intake pressure PMegr(n) detected by the intake pressure sensor 51 at that time. Since "n=3" at this stage, the ECU 50 slightly opens the EGR valve 18 by three stages. In the present embodiment, the number of motor steps Mst(3) when the EGR valve 18 is slightly opened up to a third stage is for example "14 (5+9)".

In Step 108, successively, the ECU 50 determines whether or not a change from the intake pressure PMegr(0) during full close of the EGR valve 18 to the intake pressure PMegr(n) at the time of slightly opening by n-stage(s) is larger than the reference value 13. Since "n=3" at this time, the ECU 50 determines whether or not a change from the intake pressure PMegr(0) during full close to the intake pressure PMegr(3) at the time of slightly opening by three stages is larger than the reference value β. If YES in Step 108, that is, if the intake pressure PM has been somewhat changed, the valve element 33 is considered as having actually been moved, and the ECU 50 shifts the processing to Step 109.

In Step 109, the ECU 50 stores, in the memory, the number of motor steps Mst(n) at time of slightly opening by n-stage(s) as the foreign-matter lodging position EGRst(n), and returns the processing to Step 100. Herein, the opening position of the valve element 33 obtained when the valve element 33 is slightly opened and the intake pressure PM is changed is stored in the memory as the foreign-matter lodging position EGRst(n). At this stage, the number of motor steps Mst(3) at the time of slightly opening by three stages, i.e., "14" is stored in the memory as the foreign-matter lodging position EGRst (3).

On the other hand, if NO in Step 108, that is, if the intake pressure PM has not been somewhat changed, the valve element 33 is not considered as having been moved, and the ECU 50 determines in Step 110 whether or not the aforementioned (n) is larger than the reference value a1. If NO in Step 110, the ECU 50 returns the processing to Step 106 again.

On the other hand, if YES in Step 110, the ECU 50 determines in Step 111 that the EGR valve 18 is abnormal and returns the processing to Step 100.

Figure 4:
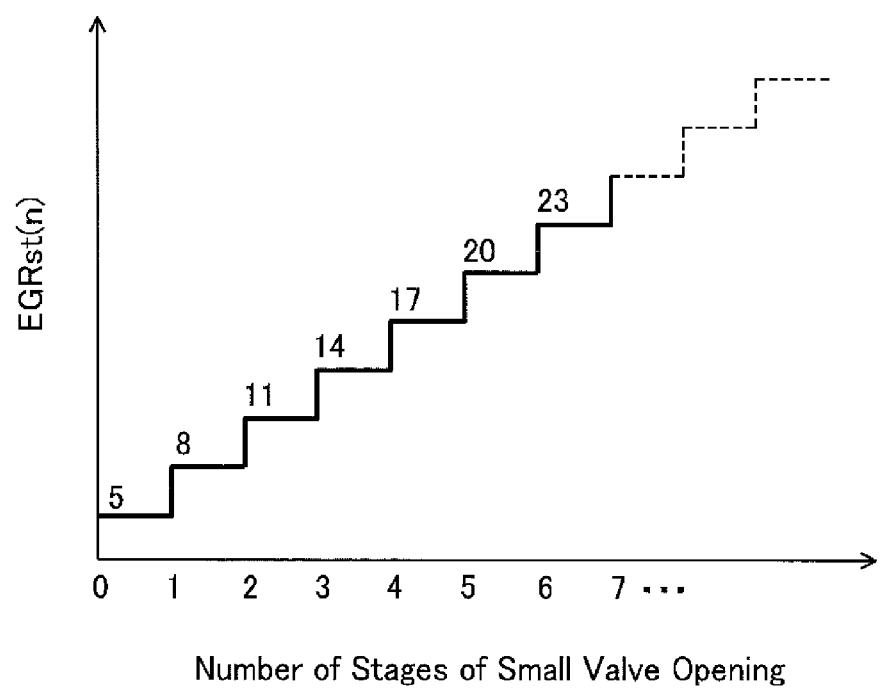
FIG. 4 is a graph showing a relationship between the number of stages of fine valve opening and foreign-matter lodged position in the first embodiment.

Herein, if NO in Step 110, the ECU 50 repeats the processings in Steps 106 to 110. Accordingly, the foreign-matter lodging position EGRst(n) is determined so as to increase in a stepwise manner according to the number of stages of slight or small opening of the EGR valve 18. FIG. 4 is a graph showing a relationship between this number of stages of small opening and the foreign-matter lodging position EGRst(n).

In the processing of the above foreign-matter lodging determination, the ECU 50 determines, as the foreign-matter lodging position EGRst(n), the opening position obtained when the opening position of the valve element 33 is slightly increased from full close in a stepwise manner and the intake pressure PM detected by the intake pressure sensor 51 is changed accordingly, sets the relevant opening position as a small opening position at which the valve element 33 is opened from full close. In the above way, the foreign-matter lodging determination (Xegr) between the valve seat 32 and the valve element 33 in the EGR valve 18 is performed to the foreign-matter lodging position EGRst(n) is detected.

Figure 5:
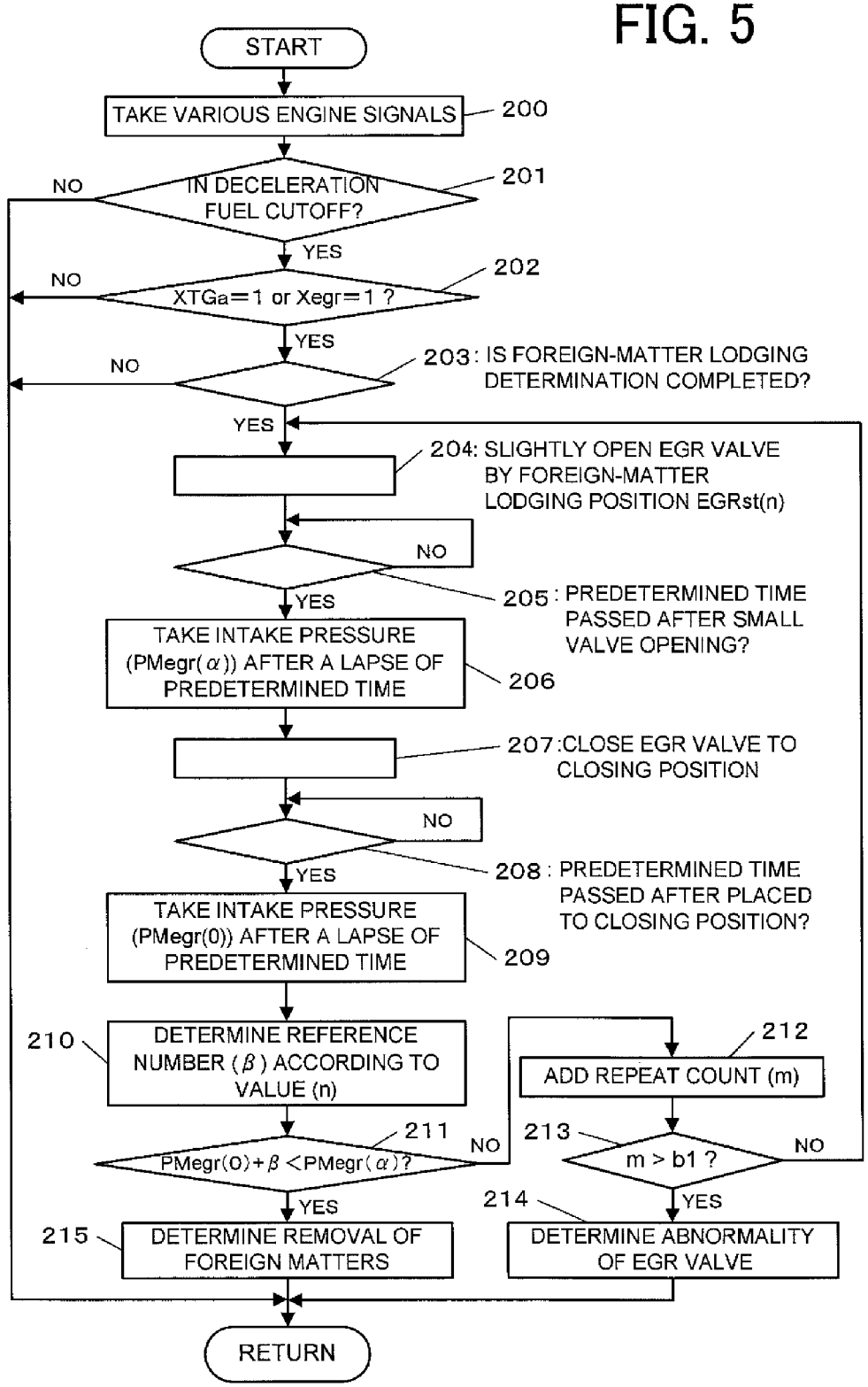
FIG. 5 is a flowchart showing one example of details of processing of foreign-matter removal control in the first embodiment.

FIG. 5 is a flowchart showing one example of details of the processing of the foreign-matter removal control to be executed by the ECU 50. This foreign-matter removal control is performed to remove the foreign matters from adhering to the valve seat 32 or the valve element 33 in the EGR valve 18 or from lodging between the valve seat 32 and the valve element 33.

When the processing shifts to this routine, the ECU 50 firstly takes, in Step 200, various engine signals representing the operating condition of the engine 1.

In Step 201, the ECU 50 determines whether or not the engine 1 is in the deceleration fuel cutoff condition. If NO in Step 201, the ECU 50 returns the processing to Step 200. If YES in Step 201, on the other hand, the ECU 50 shifts the processing to Step 202.

In Step 202, the ECU 50 determines whether or not the execution flag XTGa is "1" or the foreign-matter determination flag Xegr is "1". Specifically, the ECU 50 determines whether or not the foreign-matter removal operation in the EGR valve 18 is permitted or whether or not the foreign matters are lodged. The ECU 50 returns the processing to Step 200 if NO in Step 202, while shifts the processing to the Step 203 if YES in Step 202.

In Step 203, the ECU 50 determines whether or not the foreign-matter lodging determination is completed, that is, whether or not the processing in the flowchart shown in FIG. 3 explained above is completed. If NO in Step 203, the ECU 50 returns the processing to Step 200. If YES in Step 203, on the other hand, the ECU 50 shifts the processing to Step 204.

In Step 204, the ECU 50 controls the step motor 34 to slightly open the EGR valve 18 by the foreign-matter lodging position EGRst(n) detected most recently. Herein, in the processing of foreign-matter lodging determination, the opening position of the valve element 33 detected when the intake pressure PM is changed is determined as the foreign-matter lodging position EGRst(n) and set as the small opening position of the valve element 33 for foreign-matter removal. Accordingly, the foreign-matter lodging position EGRst(n) and the small opening position become a slightly larger opening position than a position where the valve element 33 actually catches foreign matters.

In Step 205, the ECU 50 slightly opens the EGR valve 18 as above and then, after a lapse of a predetermined time, shifts the processing to Step 206. Herein, for example, "0.5 second" is applicable to the predetermined time.

In Step 206, after the predetermined time passes while the EGR valve 18 is in the slightly opened state, the ECU 50 takes intake pressure PMegr($\alpha$) detected by the intake pressure sensor 51.

In Step 207, thereafter, the ECU 50 controls the step motor 34 to place the EGR valve 18 to a closing position. In the present embodiment, the closing position means a full closing position.

After the EGR valve 18 is placed to the closing position, the ECU 50 waits a lapse of a predetermined time in Step 208 and then advances the processing to Step 209. Herein, for example, "0.5 second" is applicable to the predetermined time.

In Step 209, the ECU 50 takes intake pressure PMegr(0) detected by the intake pressure sensor 51 after the predetermined time passed while the EGR valve 18 is in the closing position.

Figure 6:
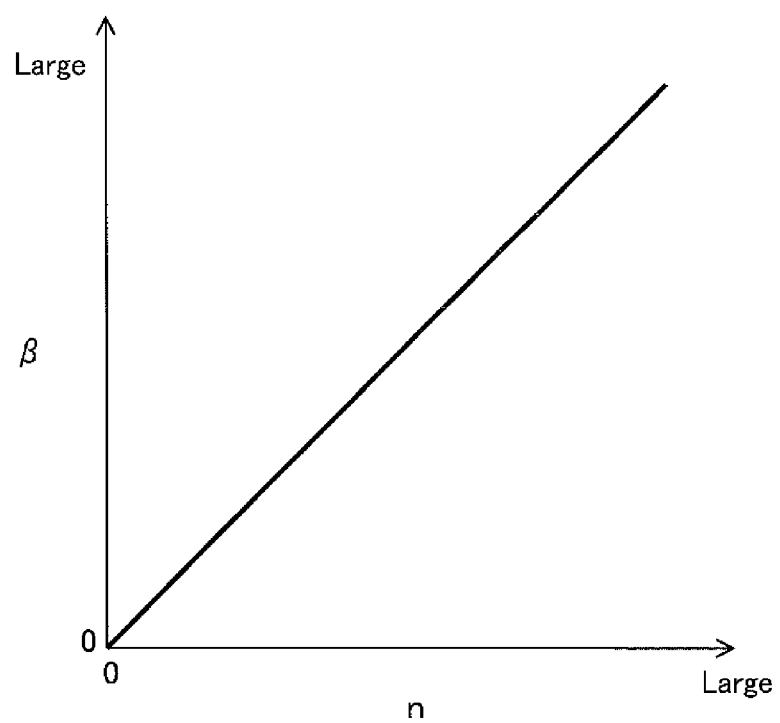
FIG. 6 is a map showing a relationship between the number of stages and referential value in the first embodiment.

In Step 210, a predetermined reference value $\beta$ according to the value (n) is calculated. Herein, the value (n) corresponds to the number of stages of small opening mentioned above. The ECU 50 calculates this reference value by referring to a map shown in FIG. 6. This map shows a relationship between the number of stages (n) and the reference value $\beta$, in which the number of stages (n) and the reference value $\beta$ are set in a proportional relationship.

In Step 211, the ECU 50 determines whether or not a value obtained by adding the reference value $\beta$ to the intake pressure PMegr(0) obtained when the EGR valve 18 is placed at the closing position is smaller than the intake pressure PMegr ($\alpha$) obtained when the EGR valve 18 is slightly opened at a small opening position. In other words, the ECU 50 determines whether or not a change from the intake pressure PMegr(0) during the full close to the intake pressure PMegr ($\alpha$) during the small opening is larger than the reference value 13. If NO in Step 211, that is, if the intake pressure PM has not been somewhat changed, it is considered that the valve element 33 has not moved and hence the foreign matters remain unremoved, and thus the ECU 50 shifts the processing to Step 212.

In Step 212, the ECU 50 increments the number of repetitions (repeat count) (m) by "1". Successively, in Step 213, the ECU 50 determines whether or not the repeat count (m) is larger than a predetermined reference value b1. This reference value b1 means an upper limit of the repeat count (m). In the present embodiment, the reference value b1 may be set to for example "30".

If NO in Step 213, the ECU 50 returns the processing to Step 204 and repeats the processings in Steps 204 to 213. This series of processings is repeated until when an affirmative result is obtained in Step 211 or when an affirmative result is obtained in Step 213.

Figure 7:
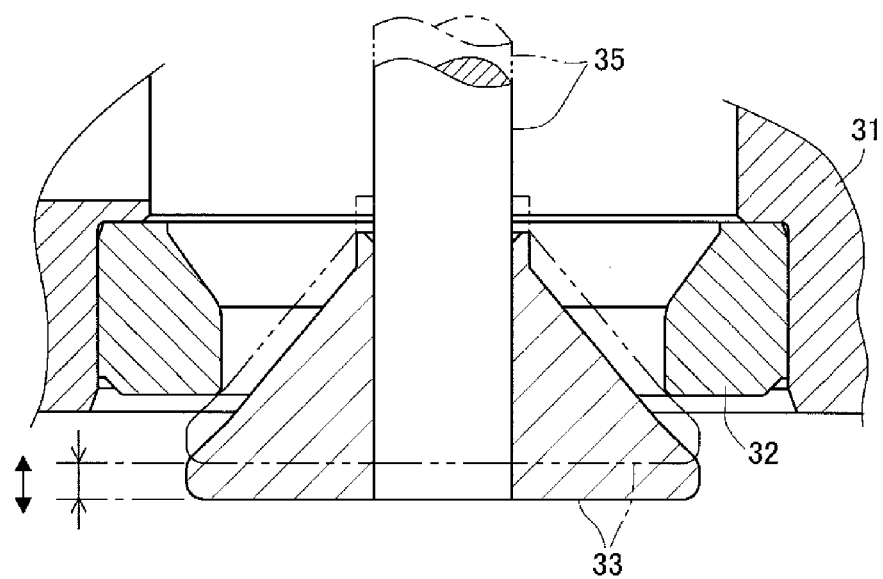
FIG. 7 is an enlarged cross sectional view showing parts of a valve seat and a valve element in the first embodiment.

When the processings in Steps 204 to 213 are repeated as above, the valve element 33 repeats reciprocation (vibration) between the closing position and the small opening position. FIG. 7 is an enlarged cross sectional view showing the valve seat 32 and the valve element 33. When the valve element 33 is repeatedly reciprocated to move into and out of contact with the valve seat 32 as shown in FIG. 7, intermittent flow is generated through a clearance between the valve seat 32 and the valve element 33. This intermittent flow is a flow of EGR gas generated by the action of negative pressure occurring in the intake passage 3 during engine deceleration. Specifically, this intermittent flow includes a flow from the EGR valve 18 toward the intake passage 3 and further alternate generation of a flow from the EGR valve 18 toward the intake passage 3 and a flow from the EGR valve 18 toward the exhaust passage 5. This generates, between the valve seat 32 and the valve element 33, high-speed intermittent flow, disturbed flow, and pulsating flow which are effective in taking away or blowing off foreign matters.

If YES in Step 211, it is considered that the valve element 33 has been vibrated as above and thus the foreign matters have been removed, and the ECU 50 determines in Step 215 that the foreign matters have been removed (foreign-matter removal determination) and returns the processing to Step 200.

On the other hand, if YES in Step 213, it is considered that the foreign matters are not removed even after the processings in Steps 204 to 213 are repeated by the required number of times, and thus the ECU 50 determines in Step 214 that the EGR valve 18 is abnormal (EGR valve abnormality determination) and returns the processing to Step 200.

In the processing of foreign-matter removal control mentioned above, the ECU 50 is arranged to control the step motor 34 of the EGR valve 18 to repeat opening and closing of the valve element 33 between the closing position and small opening position in order to remove the foreign matters adhered to the valve seat 32 or valve element 33 or lodged between the valve seat 32 and the valve element 33.

The aforementioned foreign-matter removal control is executed to remove the foreign matters when determined as being lodged between the valve seat 32 and the valve element 33 in the EGR valve 18 in the foreign-matter lodging determination. In the present embodiment, moreover, foreign-matter lodging prevention control is executed. This control is carried out at certain time intervals during operation of the engine 1 irrespective of the result of foreign-matter lodging determination in order to prevent the foreign matters from lodging in the EGR valve 18.

Figure 8:
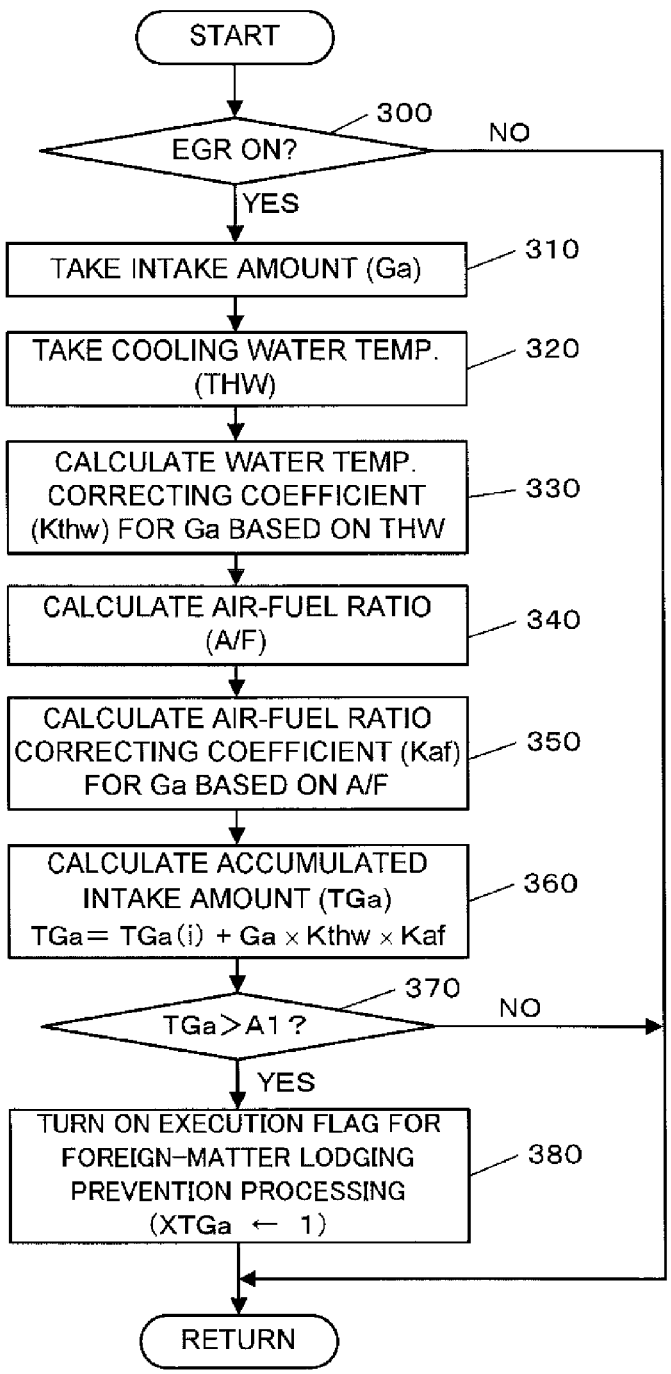
FIG. 8 is a flowchart showing one example of details of processing of execution timing determination in the first embodiment.

FIG. 8 is a flowchart showing one example of the details of the execution timing determination processing to determine the execution timing of the above foreign-matter lodging prevention control.

When the processing shifts to this routine, in Step 300, the ECU 50 first determines whether or not EGR has been turned on. In other words, the ECU 50 determines whether or not the EGR control is being executed. If NO in Step 300, the ECU 50 returns the processing to Step 300. If YES in Step 300, the ECU 50 advances the processing to Step 310.

In Step 310, the ECU 50 takes the intake amount Ga based on a detection signal of the air flow meter 54.

In Step 320, subsequently, the ECU 50 takes the cooling water temperature THW based on a detection signal of the water-temperature sensor 53.

Figure 9:
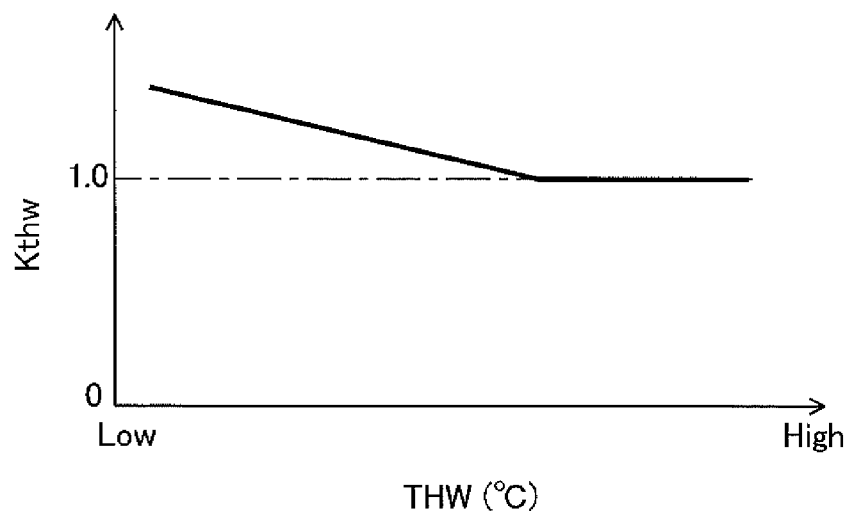
FIG. 9 is a map showing a relationship between cooling water temperature and water temperature correcting coefficient in the first embodiment.

In Step 330, the ECU 50 calculates a water-temperature correcting coefficient Kthw for the intake amount Ga based on the detected cooling water temperature THW. The ECU 50 calculates this water temperature correcting coefficient Kthw by referring to function data (map) shown in FIG. 9. In FIG. 9, a relationship between the cooling water temperature THW and the water temperature correcting coefficient Kthw is set. In this map, the water temperature correcting coefficient Kthw is set to be larger on a lower temperature side. This is determined in consideration of a situation that carbon is more likely to be discharged from EGR gas as the temperature is lower.

In Step 340, the ECU 50 calculates an air-fuel ratio A/F based on a detection signal of the air-fuel ratio sensor 55.

Figure 10:
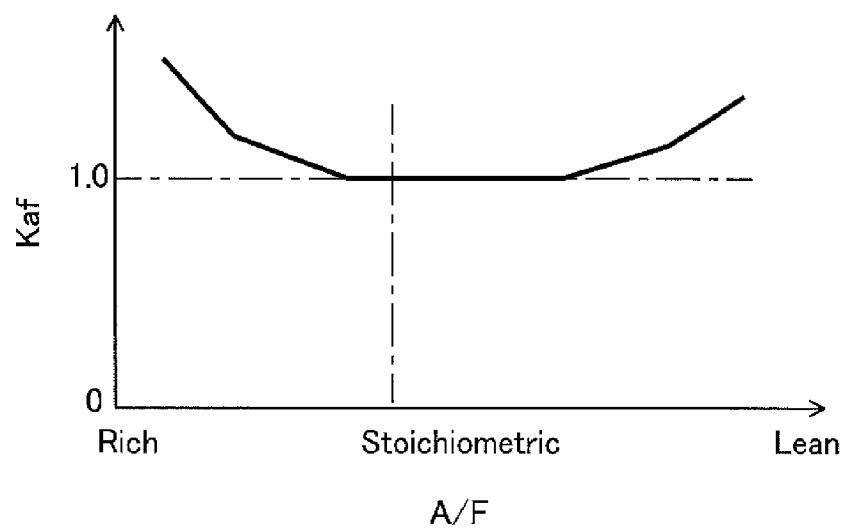
FIG. 10 is a map showing a relationship between air-fuel ratio and air-fuel ratio correcting coefficient in the first embodiment.

In Step 350, the ECU 50 calculates an air-fuel ratio correcting coefficient Kaf for the intake amount Ga based on the detected air-fuel ratio A/F. The ECU 50 calculates this air-fuel correcting coefficient Kaf by referring to function data (map) shown in FIG. 10. In FIG. 10, a relationship between the air-fuel ration A/F and the air-fuel ratio correcting coefficient Kaf is set. In this map, the air-fuel ratio correcting coefficient Kaf is set to be larger as it is closer to a rich side and a lean side. This is determined in consideration of a situation that carbon is more likely to be discharged from EGR gas as it is closer to the rich side and the lean side.

In Step 360, the ECU 50 calculates the accumulated intake amount TGa. The ECU 50 calculates a new accumulated intake amount TGa by adding a result obtained by multiplying a currently found intake amount Ga by each of the correcting coefficients Kthw and Kaf to a previously found accumulated intake amount TGa(i).

Thereafter, in Step 370, the ECU 50 determines whether or not the newly found accumulated intake amount TGa is larger than a predetermined reference value A1. This reference value A1 corresponds to the time at which foreign matters such as carbon are more and more likely to adhere to the valve seat 32 of valve element 33 in the EGR valve 18 after the EGR is turned on. If NO in Step 370, the ECU 50 returns the processing to Step 300. If YES in Step 370, on the other hand, the ECU 50 shifts the processing to Step 380.

In Step 380, the ECU 50 turns on the execution flag XTGa of the foreign-matter lodging prevention control of the EGR valve 18, that is, sets this flag to "1" and then returns the processing to Step 300.

In the above execution timing determination processing, after the ECU 50 starts control of the EGR valve 18 for execution of the EGR control, when the accumulated value TGa of the intake amount Ga measured by the air flow meter 54 exceeds the predetermined reference value A1, the ECU 50 sets the execution flag XTGa to "1" to allow the foreign-mater removal control or foreign-matter lodging determination. When the accumulated value TGa of the intake amount Ga does not exceed the reference value A1, the ECU 50 sets the execution flag XTGa to "0" to inhibit the foreign-mater removal control or foreign-matter lodging determination. Furthermore, when the accumulated value of the intake amount Ga is to be calculated, the ECU 50 corrects the intake amount Ga according to the cooling water temperature THW detected by the water temperature sensor 53, that is, the temperature state of the engine 1, and then accordingly corrects the accumulated value of the intake amount Ga.

Figure 11:
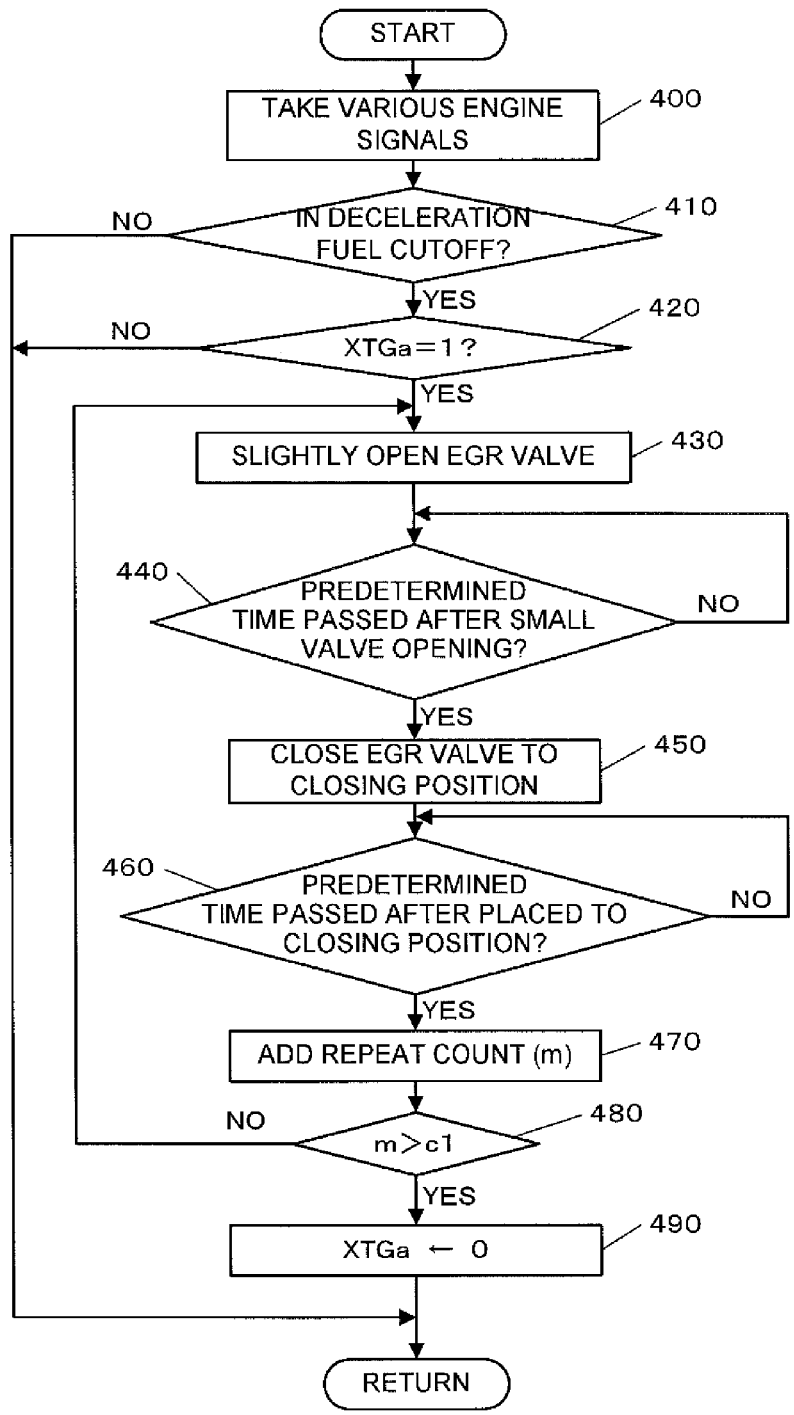
FIG. 11 is a flowchart showing one example of details of processing of foreign-matter lodging prevention control in the first embodiment.

FIG. 11 is a flowchart showing one example of details of the processing of foreign-matter lodging prevention control to be executed by the ECU 50.

When the processing advances to this routine, in Step 400, the ECU 50 firstly takes various engine signals representing the operating state of the engine 1.

In Step 410, the ECU 50 determines whether or not the engine 1 is in the deceleration fuel cutoff condition. If NO in Step 410, the ECU 50 returns the processing to Step 400. If YES in Step 410, on the other hand, the ECU 50 shifts the processing to Step 420.

In Step 420, the ECU 50 then determines whether or not the execution flag XTGa is "1". If NO in Step 420, considering that it is not the execution timing of the foreign-matter lodging prevention processing, the ECU 50 returns the processing to Step 400. If YES in Step 420, considering that it is the execution timing of the same, the ECU 50 shifts the processing to Step 430.

In Step 430, the ECU 50 controls the step motor 34 to slightly open the EGR valve 18. The small opening position for small valve opening may be set to the foreign-matter lodging position EGRst(n) calculated in the foreign-matter lodging determination processing or any arbitrary small opening position previously set. For example, this arbitrary small opening position can be set to "11 (5+6)" which is the number of motor steps Mst(2) obtained when the EGR valve 18 is slightly opened by two stages from the fully closed position.

Successively, the ECU 50 waits for a lapse of a predetermined time after fine valve opening in Step 440 and then shifts the processing to Step 450. This predetermined time can be set to for example 0.5 second.

In Step 450, the ECU 50 controls the step motor 34 to place the EGR valve 18 to a closing position. In the present embodiment, the closing position means a full closing position.

In Step 460, the ECU 50 waits for a lapse of a predetermined time after closing to the closing position, and then shifts the processing to Step 470. This predetermined time can be set to for example 0.5 second.

In Step 470, the ECU 50 increments the repeat count (m) by 1. Successively, in Step 480, the ECU 50 determines whether or not the repeat count (m) is larger than a predetermined reference value c1. This reference value c1 may be set to for example "20". If NO in Step 480, the ECU 50 returns the processing to Step 430 to repeat the processings in Steps 430 to 480. If YES in Step 480, the ECU 50 shifts the processing to Step 490.

Herein, the processings in Steps 430 to 480 are repeated, thereby allowing the valve element 33 to repeat reciprocation (vibration) between the closing position and the small valve opening position as shown in FIG. 7. This generates, between the valve seat 32 and the valve element 33, high-speed intermittent flow, disturbed flow, and pulsating flow which are effective in taking away or blowing off foreign matters.

On the other hand, in Step 490, the ECU 50 resets the execution flag XTGa to 0 and returns the processing to Step 400.

In the aforementioned foreign-matter lodging prevention control, the ECU 50 controls the step motor 34 to allow the valve element 33 to repeatedly open and close between the closing position and the small opening position in order to prevent foreign matters from adhering to the valve seat 32 or the valve element 33 or from lodging between the valve seat 32 and the valve element 33.

According to the exhaust gas recirculation apparatus for engine in the present embodiment explained above, the negative pressure is generated in the intake passage 3 during deceleration of the engine 1, and this negative pressure acts on the EGR passage 17. At that time, the ECU 50 executes the foreign-matter removal control to control the EGR valve 18 to allow the valve element 33 to repeatedly open and close between the closing position (the full closing position) and the small opening position. Accordingly, high-speed intermittent flow, disturbed flow, and pulsating flow which are effective in taking away or blowing off foreign matters are generated between the valve seat 32 and the valve element 33 in the EGR valve 18. This flow acts on the foreign matters adhered to the valve seat 32 or the valve element 33 or lodged between the valve seat 32 and the valve element 33. Consequently, the foreign matters adhered between the valve seat 32 and the valve element 33 in the EGR valve 18 or lodged between the valve seat 32 and the valve element 33 can be taken away or blown off from the valve seat 32 and the valve element 33 by the intermittent flow or the like. Thus, the foreign matters are reliably removed. The above operations and effects can be obtained similarly even in the case of foreign-matter lodging prevention control.

In the present embodiment, during deceleration fuel cutoff of the engine 1, the valve element 33 of the EGR valve 18 is repeatedly opened and closed at the small opening position in order to remove the foreign matters from the valve seat 32 or valve element 33. Thus, the throttle valve 21 is closed during deceleration, thereby causing the negative pressure to be surely generated in the surge tank 3a, and this negative pressure will act on the EGR passage 17 and the EGR valve 18. This can produce high-speed flow of EGR gas in a fine clearance between the valve seat 32 and the valve element 33. Accordingly, intermittent flow, disturbed flow, or pulsating flow can be reliably generated in the fine clearance. In the present embodiment, furthermore, the fuel supply to the engine 1 is cut off while the EGR gas flows from the EGR valve 18 to the intake passage 3, so that no fuel burns in the combustion chamber 16. Thus, even when EGR gas flows in the combustion chamber 16 through the intake passage 3, a burning condition in the combustion chamber 16 does not vary or fluctuate. This can prevent variation in the operation of the engine 1 or deterioration of exhaust gas during the foreign-matter removal control or foreign-matter lodging prevention control.

In the present embodiment, the intake pressure PM in the intake passage 3 (the surge tank 3a) downstream from a position where the exhaust gas flows from the EGR passage 17 to the intake passage 3 is detected by the intake pressure sensor 51. Accordingly, the intake pressure PM influenced by opening and closing of the valve element 33 of the EGR valve 18 is detected by the intake pressure sensor 51. Herein, while the foreign matters are lodged or caught between the valve seat 32 and the valve element 33, even when the ECU 50 drives the step motor 34 to slightly increase the opening position of the valve element 33 from the fully closed position in stepwise fashion for the foreign-matter lodging determination processing, the opening position of the valve element 33 is not changed and hence the intake pressure PM detected by the intake pressure sensor 51 remains unchanged. When the opening position of the valve element 33 is thereafter increased, releasing lodged foreign matters, the opening position of the valve element 33 is actually changed and hence the intake pressure PM detected by the intake pressure sensor 51 is changed. The opening position of the valve element 33 at the time when the intake pressure PM is changed is determined as the foreign-matter lodging position EGRst(n) and set as the small opening position for removal of foreign matters. However, they are slightly larger than the position of the valve element 33 at which the valve element 33 actually caught the foreign matters. Therefore, when the valve element 33 is repeatedly opened and closed at the small opening position, it is possible to prevent the foreign matters from lodging between the valve seat 32 and the valve element 33, thereby prompting removal of the foreign matters from the valve seat 32 or the valve element 33.

In the present embodiment, for the EGR control, the EGR valve 18 is controlled by the ECU 50 to regulate the EGR flow rate in the EGR passage 17. Herein, after the ECU 50 starts control of the EGR valve 18, when the accumulated value of the intake amount Ga measured by the air flow meter 54, that is, the accumulated intake amount TGa exceeds the predetermined reference value A1, the ECU 50 is permitted to execute the foreign-matter removal control, foreign-matter lodging prevention control, or foreign-matter lodging determination processing, and the ECU 50 sets the execution flag XTGa to "1". On the other hand, when the accumulated intake amount TGa does not exceed the reference value A1, the ECU 50 is inhibited to execute be foreign-matter removal control, foreign-matter lodging prevention control, or foreign-matter lodging determination processing, and the ECU 50 sets the execution flag XTGa to "0". Accordingly, at a time interval defined as a period in which the accumulated intake amount TGa reaches the reference value A1, the foreign-matter removal control, foreign-matter lodging prevention control, or foreign-matter lodging determination processing is repeated. Thus, the foreign-matter removal control, foreign-matter lodging prevention control, or foreign-matter lodging determination processing can be executed at an appropriate time interval, so that normal opening and closing operations of the valve element 33 of the EGR valve 18 can be ensured.

In the present embodiment, when the accumulated intake amount TGa is determined by the ECU 50 in the execution timing determination processing, the accumulated intake amount TGa is corrected according to the cooling water temperature THW of the engine 1. Thus, the degree of adhesion of foreign matters to the valve seat 32 or valve element 33, different according to the cooling water temperature THW, i.e., the temperature condition of the engine 1, is, reflected in the interval of repeating the foreign-matter removal control, foreign-matter lodging prevention control, or foreign-matter lodging determination processing. In particular, the degree of adhesion of carbon in the exhaust gas to the valve seat 32 or valve element 33 differs according to the temperature condition of the engine 1. Thus, the repetition interval of the foreign-matter removal control, foreign-matter lodging prevention control, or foreign-matter lodging determination processing can be changed according to the degree of adhesion of foreign matters to the valve seat 32 or valve element 33. At a low temperature in which foreign matters are likely to adhere, the repetition interval of the processing can be shortened.

Second Embodiment

A second embodiment of an exhaust gas recirculation apparatus for engine according to the invention will be described in detail below referring to the accompanying drawing.

In the following explanation, similar or identical parts to those in the first embodiment are given the same reference signs as those in the first embodiment. The following explanation is thus focused on differences from the first embodiment.

Figure 12:
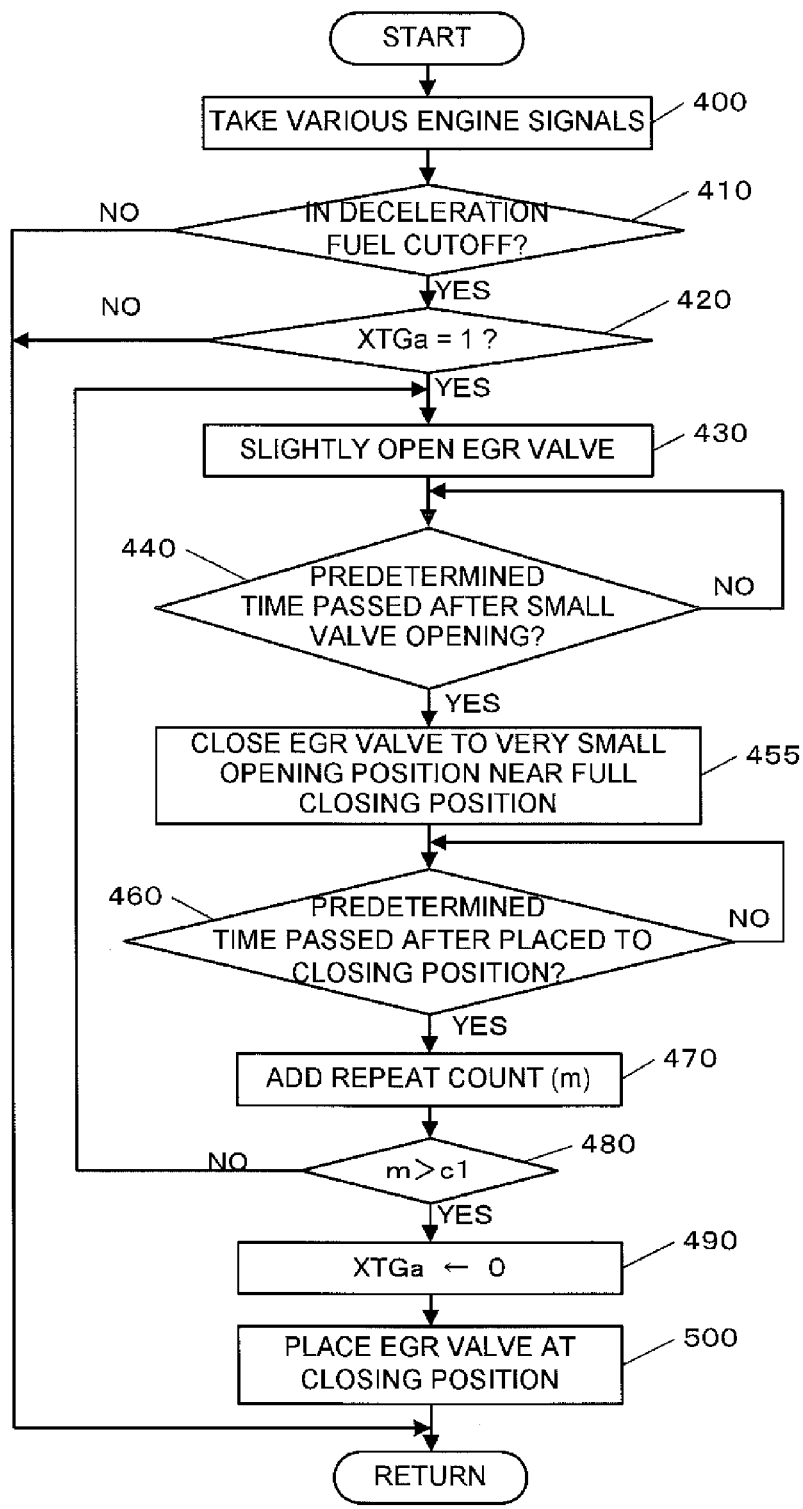
FIG. 12 is a flowchart showing one example of details of processing of foreign-matter lodging prevention control in a second embodiment.

The present embodiment differs from the first embodiment in the details of the foreign-matter lodging prevention processing. FIG. 12 is a flowchart showing one example of the details of the foreign-matter lodging prevention control processing to be executed by the ECU 50.

The flowchart shown in FIG. 12 differs from the flowchart shown in FIG. 11 in the details of processings in Steps 455 and 500. The Step 455 in the flowchart in FIG. 12 corresponds to the Step 450 in the flowchart in FIG. 11. The details of processings in other Steps 400 to 440 and 460 to 490 in FIG. 12 are the same as those in the flowchart in FIG. 11.

As shown in FIG. 12, in the Step 455 following the Step 440, the ECU 50 closes the EGR valve 18 to a very small opening position near a full closing position. This very small opening position near the full closing position is defined as a closing position in the present embodiment. In the present embodiment, the number of motor steps Mst(0) during full close of the EGR valve 18 is assumed to be "5", for example, the very small opening position near the full closing position can be set to "8 (=5+3)" which is the number of motor steps Mst(1) determined when the EGR valve 18 is slightly opened by first one stage. In the present embodiment, the opening position of the EGR valve 18 when slightly opened in Step 430 according to the above very small opening position near the full closing position can be set to "14 (~5+9)" which is the number of motor steps Mst(3) determined when the EGR valve 18 is slightly opened by three stages from full close.

As shown in FIG. 12, in Step 500 following Step 490, the ECU 50 places the EGR valve 18 at the closing position and returns the processing to Step 400. In this case, the ECU 50 can set the number of motor steps Mst(0) of the step motor 34 of the EGR valve 18 to "5", for example.

In the present embodiment, therefore, in the foreign-matter lodging prevention control processing, when the ECU 50 causes the valve element 33 to repeatedly open and close between the closing position and the small opening position, the valve element 33 is closed under the condition that the very small opening position near the full closing position is set as the closing position. Thus, even when the valve element 33 is repeatedly opened and closed, the valve element 33 does not contact or collide with the valve seat 32. In the above control in which the valve element 33 is repeatedly opened and closed, it is therefore possible to prevent the foreign matters separated from the valve seat 32 of valve element 33 from lodging again between the valve seat 32 and the valve element 33. This can prevent generation of collision sound between the valve seat 32 and the valve element 33.

Third Embodiment

A third embodiment embodying an exhaust gas recirculation apparatus for engine according to the present invention will be explained in detail below referring to the accompanying drawing.

Figure 13:
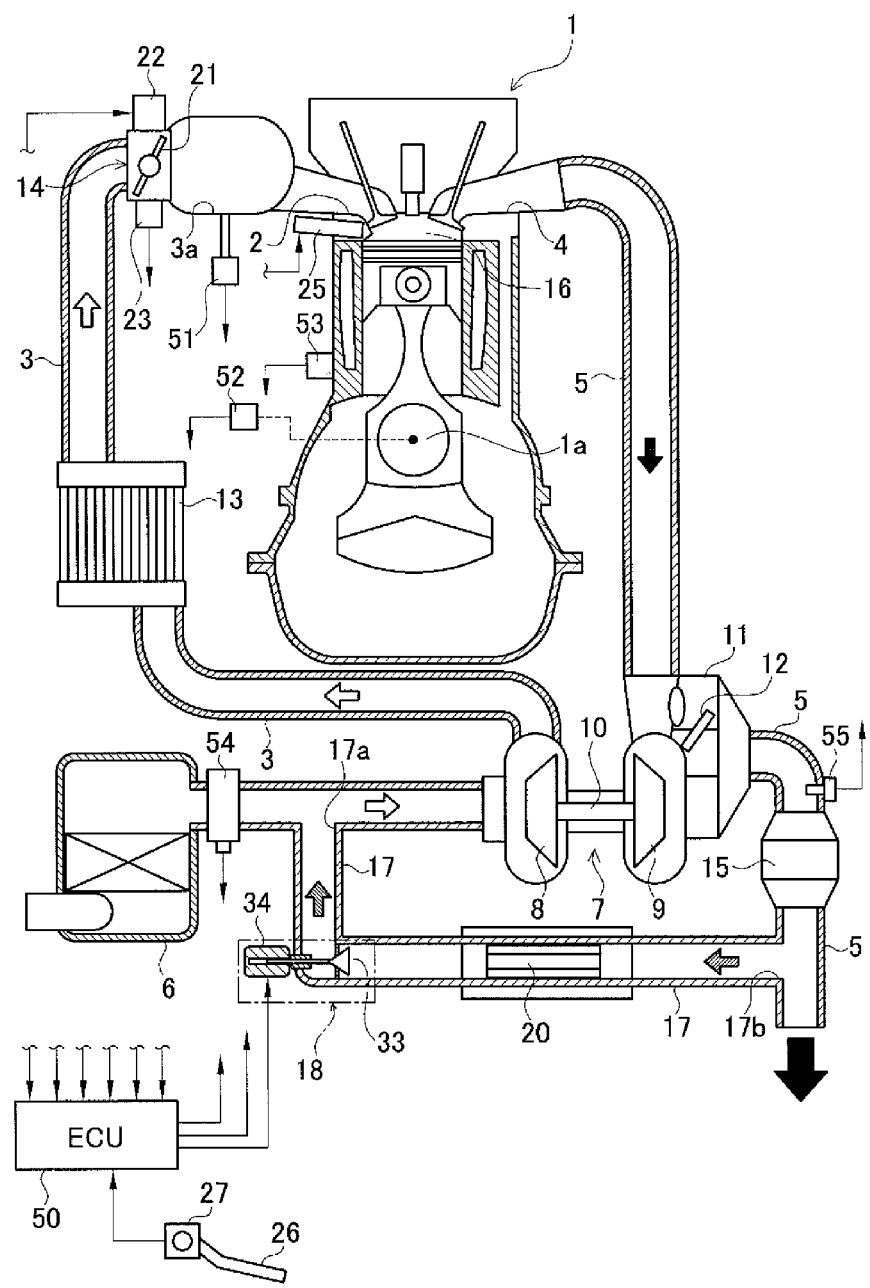
FIG. 13 is a schematic configuration view showing a supercharger-equipped engine system including an exhaust gas recirculation (EGR) apparatus for engine in a third embodiment.

FIG. 13 is a schematic configuration view showing a supercharger-equipped engine system including an EGR apparatus in this embodiment. The present embodiment differs from the first and second embodiments in placement of the EGR apparatus as shown in FIG. 13. In the present embodiment, specifically, the EGR passage 17 is connected, at its inlet 17b, to the exhaust passage 5 downstream of the catalytic convertor 15 and, at its outlet 17a, to the intake passage 3 upstream of the compressor 8 of the supercharger 7. Other configurations are identical to those in each of the above embodiments.

According to the present embodiment, while the engine 1 is operating and also the EGR valve 18 is being open during operation of the supercharger 7, the negative pressure resulting from the supercharged intake pressure acts on the outlet 17a of the EGR passage 17 through the intake passage 3 upstream of the compressor 8. Thus, part of exhaust gas flowing in the exhaust passage 5 downstream of the catalytic convertor 15 is sucked into the intake passage 3 via the EGR passage 17, EGR cooler 20, and the EGR valve 18. Herein, even in a high-supercharging region, the catalytic convertor 15 acts as a resistance on the downstream side of the catalytic convertor 15, thereby reducing gas pressure to a certain degree. Accordingly, EGR can be performed by making the negative pressure resulting from the supercharged intake pressure act on the EGR passage 17 up to the high-supercharging region. Since part of exhaust gas cleaned up by the catalytic convertor 15 is introduced in the EGR passage 17, the present embodiment can omit the EGR catalytic convertor 19 from the EGR passage 17 as compared with the first embodiment. The other operations and effects in the present embodiment are the same as those in each of the above embodiments.

The present invention is not limited to each of the above embodiments but may be embodied in other specific forms without departing from the essential characteristics thereof.

Each of the above embodiments applies the EGR apparatus of the invention to the engine 1 equipped with the supercharger 7. Alternatively, the EGR apparatus of the invention may be applied to an engine equipped with no supercharger.

In each of the above embodiments, the step motor 34 is used as an actuator constituting the EGR valve 18. As an alternative, a motor other than a step motor may be used.

While the presently preferred embodiment of the present invention has been shown and described, it is to be understood that this disclosure is for the purpose of illustration and that various changes and modifications may be made without departing from the scope of the invention as set forth in the appended claims.

INDUSTRIAL APPLICABILITY

The present invention is utilizable in a gasoline engine or diesel engine for vehicle.

REFERENCE SINGS LIST

1 Engine
2 Intake port
3 Intake passage
3a Surge tank
4 Exhaust port
5 Exhaust passage
16 Combustion chamber
17 EGR passage
17a Outlet
17b Inlet
18 EGR valve
32 Valve seat
33 Valve element
34 Step motor
50 ECU
51 Intake pressure sensor
53 Water temperature sensor
54 Air flow meter
55 Air-fuel ratio sensor
PM Intake pressure
THW Cooling-water temperature
Ga Intake flow rate
TGa Accumulated intake amount
A/F Air-fuel ratio
A1 Predetermined value
EGRst(n) Foreign-matter lodging position at n-th stage

The invention claimed is:
1. An exhaust gas recirculation apparatus for an engine, comprising:
an exhaust gas recirculation passage for allowing part of exhaust gas discharged from a combustion chamber of an engine to an exhaust passage to flow in an intake passage and recirculate back to the combustion chamber; and an exhaust gas recirculation valve provided in the exhaust gas recirculation passage to regulate an exhaust flow rate in the exhaust gas recirculation passage, the exhaust gas recirculation valve including a valve seat, a valve element provided to be seatable on the valve seat, and an actuator to drive the valve element, wherein the apparatus further includes a foreign-matter removal control unit to control the exhaust gas recirculation valve to repeatedly open and close the valve element between a closing position and an opening position to remove foreign matters stuck to the valve seat or the valve element, and wherein the closing position is an opening position substantially close to a full closing position and less than a full opening position.

2. The exhaust gas recirculation apparatus for the engine according to claim 1, further comprising a fuel supply unit to supply fuel to the engine, wherein the foreign-matter removal control unit is configured to control the exhaust gas recirculation valve when the engine is decelerated and fuel supply to the engine by the fuel supply unit is cut off.

3. The exhaust gas recirculation apparatus for the engine according to claim 1, further comprising:

an intake pressure detection unit configured to detect intake pressure in the intake passage downstream from a position where exhaust gas flows from the exhaust gas recirculation passage to the intake passage; and a foreign-matter lodging determination unit configured to (1) increase an opening position of the valve element in a stepwise manner from the closing position, and (2) determine, as a foreign-matter lodging position, an opening position detected when the intake pressure detected by the intake pressure detection unit is changed according to the increased opening position, and set the determined opening position as the small opening position.

4. The exhaust gas recirculation apparatus for the engine according to claim 3, further comprising:

an exhaust gas recirculation control unit to control the exhaust gas recirculation valve according to an operating condition of the engine in order to regulate the exhaust flow rate;

an intake amount measuring unit arranged to measure an intake amount of air allowed to flow in the intake passage; and a processing specifying unit arranged, after the exhaust gas recirculation control unit starts control of the exhaust gas recirculation valve, to permit determination by the foreign-matter lodging determination unit when an accumulated value of the intake amount measured by the intake amount measuring unit exceeds a predetermined reference value, but to inhibit the determination of the foreign-matter lodging determination unit when the accumulated value of the intake amount is less than the reference value.

5. The exhaust gas recirculation apparatus for the engine according to claim 4, further comprising a temperature condition detection unit arranged to detect a temperature condition of the engine, wherein the processing specifying unit corrects an accumulated value of the intake amount according to the temperature condition detected by the temperature condition detection unit.

6. The exhaust gas recirculation apparatus for the engine according to claim 2, further comprising:

an intake pressure detection unit configured to detect intake pressure in the intake passage downstream from a position where exhaust gas flows from the exhaust gas recirculation passage to the intake passage; and a foreign-matter lodging determination unit configured to (1) increase an opening position of the valve element in a stepwise manner from the closing position, and (2) determine, as a foreign-matter lodging position, an opening position detected when the intake pressure detected by the intake pressure detection unit is changed according to the increased opening position, and set the determined opening position as the small opening position.

7. The exhaust gas recirculation apparatus for the engine according to claim 6, further comprising:

an exhaust gas recirculation control unit to control the exhaust gas recirculation valve according to an operating condition of the engine in order to regulate the exhaust flow rate;

an intake amount measuring unit arranged to measure an intake amount of air allowed to flow in the intake passage; and a processing specifying unit arranged, after the exhaust gas recirculation control unit starts control of the exhaust gas recirculation valve, to permit control of the foreign-material removal control unit when an accumulated value of the intake amount measured by the intake amount measuring unit exceeds a predetermined reference value, but to inhibit the control of the foreign-material removal control unit when the accumulated value of the intake amount is less than the reference value.

8. The exhaust gas recirculation apparatus for the engine according to claim 7, further comprising a temperature condition detection unit arranged to detect a temperature condition of the engine, wherein the processing specifying unit corrects an accumulated value of the intake amount according to the temperature condition detected by the temperature condition detection unit.

9. The exhaust gas recirculation apparatus for the engine according to claim 6, further comprising:

an exhaust gas recirculation control unit to control the exhaust gas recirculation valve according to an operating condition of the engine in order to regulate the exhaust flow rate;

an intake amount measuring unit arranged to measure an intake amount of air allowed to flow in the intake passage; and a processing specifying unit arranged, after the exhaust gas recirculation control unit starts control of the exhaust gas recirculation valve, to permit determination by the foreign-matter lodging determination unit when an accumulated value of the intake amount measured by the intake amount measuring unit exceeds a predetermined reference value, but to inhibit the determination of the foreign-matter lodging determination unit when the accumulated value of the intake amount is less than the reference value.

10. The exhaust gas recirculation apparatus for the engine according to claim 9, further comprising a temperature condition detection unit arranged to detect a temperature condition of the engine, wherein the processing specifying unit corrects an accumulated value of the intake amount according to the temperature condition detected by the temperature condition detection unit.

* * * * *